US011748300B2

(12) United States Patent
Xiang et al.

(10) Patent No.: US 11,748,300 B2
(45) Date of Patent: Sep. 5, 2023

(54) REVERSE DELETION OF A CHAIN OF SNAPSHOTS

(71) Applicant: VMware, Inc., Palo Alto, CA (US)

(72) Inventors: Enning Xiang, San Jose, CA (US); Wenguang Wang, Santa Clara, CA (US); Pranay Singh, San Ramon, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/455,519

(22) Filed: Nov. 18, 2021

(65) Prior Publication Data

US 2023/0153269 A1 May 18, 2023

(51) Int. Cl.
G06F 16/11 (2019.01)
G06F 16/14 (2019.01)

(52) U.S. Cl.
CPC .......... G06F 16/128 (2019.01); G06F 16/125 (2019.01); G06F 16/14 (2019.01)

(58) Field of Classification Search
CPC ....... G06F 16/128; G06F 16/125; G06F 16/14
USPC ........................................................ 707/609
See application file for complete search history.

(56) References Cited

U.S. PATENT DOCUMENTS

| | | | |
|---|---|---|---|
| 7,386,532 B2 * | 6/2008 | Kiessig | G06F 16/10 |
| 7,865,485 B2 * | 1/2011 | Mullick | G06F 16/1774 707/827 |
| 8,250,035 B1 * | 8/2012 | Tang | G06F 16/128 707/649 |
| 8,412,688 B1 * | 4/2013 | Armangau | G06F 16/128 707/703 |
| 8,442,952 B1 * | 5/2013 | Armangau | G06F 16/1752 706/14 |
| 10,102,144 B2 * | 10/2018 | Sundararaman | G06F 12/0269 |
| 10,140,307 B1 * | 11/2018 | Armangau | G06F 16/1727 |
| 10,216,757 B1 * | 2/2019 | Armangau | G06F 16/178 |
| 10,387,369 B1 * | 8/2019 | Davenport | G06F 3/0689 |
| 10,482,065 B1 * | 11/2019 | Armangau | G06F 16/1748 |
| 11,194,506 B1 * | 12/2021 | Proulx | G06F 3/0604 |
| 2005/0065986 A1 * | 3/2005 | Bixby | G06F 16/128 |
| 2005/0066095 A1 * | 3/2005 | Mullick | G06F 16/1774 710/200 |

(Continued)

FOREIGN PATENT DOCUMENTS

| | | | | |
|---|---|---|---|---|
| CN | 105843905 B | * | 6/2019 | ........... G06F 16/128 |
| CN | 111007990 A | * | 4/2020 | ........... G06F 16/128 |

(Continued)

*Primary Examiner* — Phuong Thao Cao
(74) *Attorney, Agent, or Firm* — Dinsmore & Shohl LLP

(57) ABSTRACT

A method for the reverse deletion of a plurality of snapshots in a chain of snapshots is provided. The method includes in reverse order, starting from a latest snapshot in time to an earliest snapshot in time of the plurality of snapshots: identifying at least one of a first set of one or more data blocks of a snapshot that are shared with an earlier snapshot in time in the chain of snapshots or a second set of one or more data blocks of the snapshot that are owned by the snapshot and processing the second set of one or more data blocks and skipping processing the first set of one or more data blocks, wherein processing the second set of one or more data blocks comprises performing one or more actions to maintain and/or delete data blocks of the second set of one or more data blocks.

17 Claims, 8 Drawing Sheets

(56) References Cited

U.S. PATENT DOCUMENTS

| | | | |
|---|---|---|---|
| 2015/0066857 A1* | 3/2015 | Dayal | G06F 16/128 707/639 |
| 2015/0081993 A1* | 3/2015 | Christopher | G06F 11/1458 711/162 |
| 2016/0019082 A1* | 1/2016 | Chandrasekaran | G06F 9/45558 718/1 |
| 2016/0062678 A1* | 3/2016 | Samuels | G06F 3/0655 711/103 |
| 2017/0031776 A1* | 2/2017 | Ren | G06F 11/1451 |
| 2017/0249216 A1* | 8/2017 | Bellur | G06F 3/06 |
| 2017/0315878 A1* | 11/2017 | Purohit | G06F 16/24573 |
| 2019/0004704 A1* | 1/2019 | Rathi | G06F 3/0664 |
| 2020/0167292 A1* | 5/2020 | Horsnell | G06F 12/1027 |
| 2020/0241756 A1* | 7/2020 | Lee | G06F 3/065 |
| 2021/0294774 A1* | 9/2021 | Keller | G06F 16/125 |
| 2021/0303407 A1* | 9/2021 | Keller | G06F 16/9027 |
| 2022/0137813 A1* | 5/2022 | Nanda | G06F 3/064 711/154 |

FOREIGN PATENT DOCUMENTS

| | | | | |
|---|---|---|---|---|
| CN | 112083873 A | * | 12/2020 | |
| WO | WO-2016124959 A1 | * | 8/2016 | G06F 16/128 |

* cited by examiner

REVERSE DELETION OF A CHAIN OF SNAPSHOTS

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the VSAN, such that there may or may not be a one to one correspondence between a physical block in VSAN and a data block referenced by an LBA.

Modern storage platforms, including the VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely or in part be stored as pointers to the data blocks that existed when the snapshot was created.

Each snapshot may include its own logical map storing its snapshot metadata, e.g., a mapping of LBAs to PBAs, or its own logical map and middle map storing its snapshot metadata, e.g., mapping of LBAs to middle block addresses (MBAs) which are further mapped to PBAs, stored concurrently by several compute nodes (e.g., metadata servers). Where a logical map has not been updated from the time a first snapshot was taken to a time a subsequent snapshot was taken, snapshot logical maps may include identical mapping information for the same LBA (e.g., mapped to the same MBA and PBA). As more snapshots are accumulated over time (i.e., increasing the number of snapshot logical maps), the number of references to the same MBA and/or PBA may increase. In other words, data blocks may be shared by multiple snapshots as more snapshots are accumulated. Such data blocks may be either owned by a snapshot or shared with a subsequent snapshot (e.g., created later in time).

Occasionally, snapshots may need to be deleted. Deleting a snapshot may remove data blocks exclusively owned by the snapshot being deleted but not remove data blocks owned by the snapshot and shared with a subsequent snapshot. Accordingly, distinguishing between shared data blocks and data blocks exclusively owned by the snapshot being deleted may need to occur prior to deletion of the snapshot, as only data blocks exclusively owned by the snapshot may be deleted.

Traditional approaches to delete snapshots may involve processing each snapshot to be deleted one-by-one, starting with a snapshot created first in time. Further, when deleting the snapshot, only the data that is referenced exclusively by that snapshot is removed. Data blocks owned by the snapshot, but shared with a subsequent snapshot, may be inherited by the subsequent snapshot after deleting the snapshot. The process repeats for the subsequent snapshot until all snapshots requested to be deleted have been removed.

Accordingly, in some cases, data blocks inherited by the subsequent snapshot may not have an address (e.g., a PBA) near addresses of blocks exclusively owned by that snapshot. Data blocks originally owned by the subsequent snapshot may have good spatial locality, while inherited data blocks inherited (e.g., following the deletion of the snapshot created earlier in time) may not. Locality of reference, also known as the principle of locality, is the tendency to access the same set of storage locations repetitively over a short period of time. One type of locality, spatial locality, refers to the use of data within relatively close storage locations.

Poor locality of data blocks owned by a snapshot (e.g., including those data blocks which have been inherited from a snapshot created earlier in time as well as those data blocks exclusively owned by the snapshot) may increase input/output (I/O) overhead when traditional methods for deleting snapshots are utilized. In particular, when deleting a snapshot which has inherited one or more data blocks from a previously deleted snapshot, additional compute resources and/or I/O reads may be needed to remove data blocks placed far away from data blocks originally owned by the snapshot.

Accordingly, there is a need in the art for improved techniques to delete snapshots in a snapshot chain. Such improved techniques may take advantage of the locality of data blocks to be deleted to reduce I/O costs.

It should be noted that the information included in the Background section herein is simply meant to provide a reference for the discussion of certain embodiments in the Detailed Description. None of the information included in this Background should be considered as an admission of prior art.

DETAILED DESCRIPTION

Figure 1:
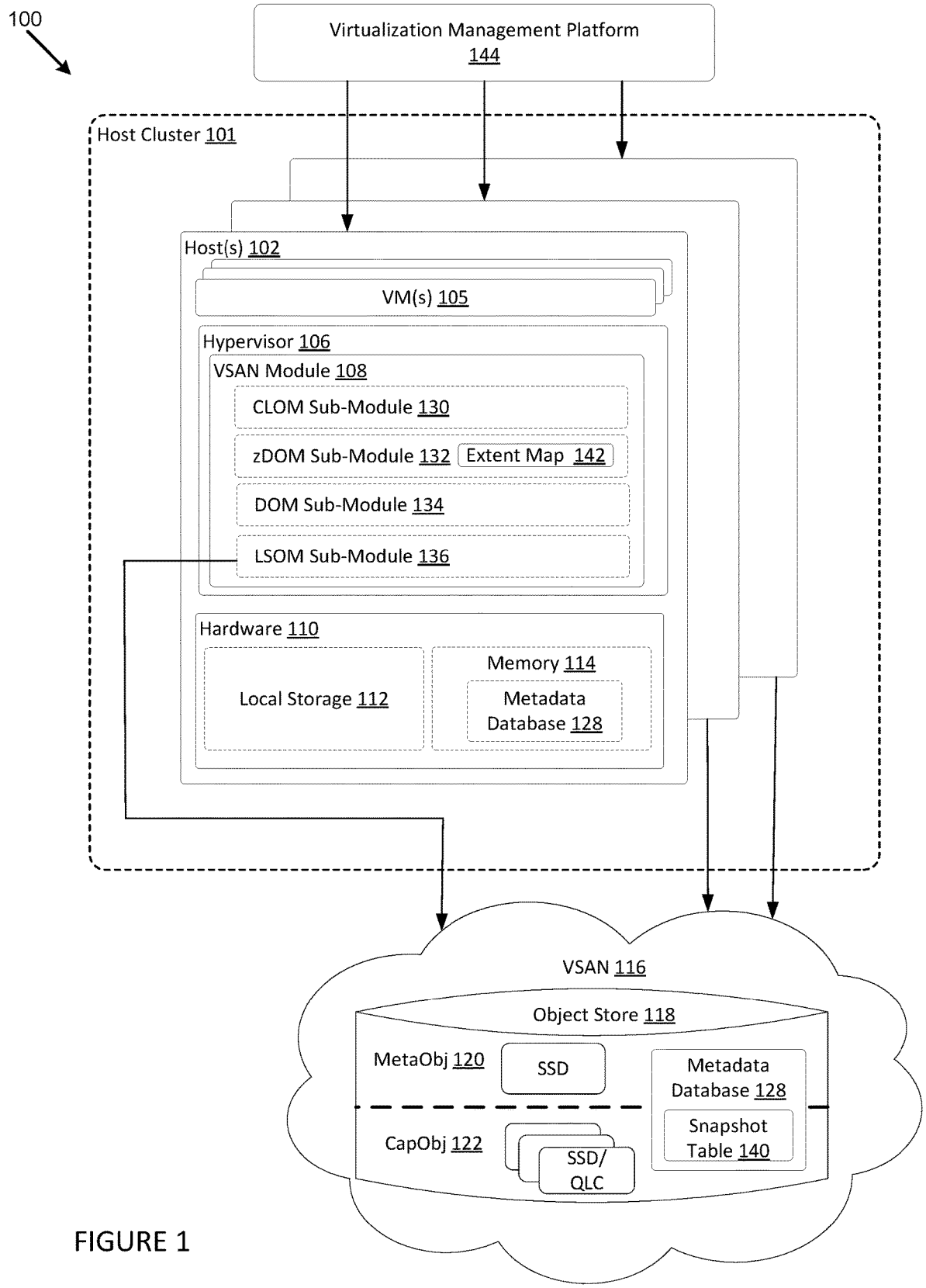
FIG. 1 is a diagram illustrating an example computing environment in which embodiments of the present application may be practiced.

Aspects of the present disclosure introduce techniques for the reverse deletion of a chain of snapshots. As used herein, a chain of snapshots refers to a sequence of snapshots created during a set of backup sessions. The first snapshot in the snapshot chain may be referred to as the parent snapshot which is created in a first backup session. The parent snapshot becomes the starting point of the snapshot chain. During a subsequent backup session, a child snapshot may be created from the parent snapshot, and accordingly, be linked to the parent snapshot. The child snapshot may be created to capture the differences from the parent snapshot when data is modified. The child snapshot then becomes a parent snapshot during an additional backup session where another child snapshot is created. Each new snapshot added may capture changes from a prior snapshot to create the chain of snapshots.

As described in more detail below, metadata for each of these snapshots may be maintained in a two-layer data block (e.g., snapshot extent) mapping architecture, where an extent is a specific number of contiguous data blocks allocated for storing information. The first layer of the two-layer mapping architecture may include a snapshot logical map (also referred to herein as a logical map), while the second layer includes a snapshot middle map (also referred to herein as a middle map). In the snapshot logical map, instead of a logical block address (LBA) of a data block being mapped directly to a physical block address (PBA), LBA(s) of data block(s) are mapped to a middle block address (MBA) of the middle map. The middle map then maps the MBA to the PBA where the data block is written. In other words, only one middle map may exist to manage block address mapping from MBAs to PBAs, while each snapshot in the snapshot chain may have its own logical map.

Accordingly, where an LBA has not been updated from the time a parent snapshot was taken to a time a child snapshot was taken, the LBA in the logical map associated with the child snapshot may point to a same MBA in the middle map, and more specifically, a same data block as the parent snapshot. Such data blocks may be referred to herein as shared data blocks. Alternatively, where an LBA has been updated from the time when the parent snapshot was taken to the time when the child snapshot was taken, a new MBA in the middle map be created mapping to a new PBA where the data for the LBA is now written. The LBA in the logical map associated with the child snapshot may point to this new MBA, and more specifically, the new data block. Such data blocks may be referred to herein as data blocks owned by the snapshot.

The MBA is monotonically increased each time a new middle map extent, mapping the MBA to a new PBA, is added to the middle map. Thus, the middle map may have good temporal locality (e.g., refers to the tendency to access memory locations that have been used recently) for new writes to new PBAs. Further, by monotonically increasing the MBA to create a new middle map extent for mapping of an LBA to a new PBA, a clear MBA boundary may exist between snapshots. In particular, the MBA mapping to the PBA of a data block owned by a child snapshot may be larger than MBA(s) mapping to PBA(s) of data block(s) owned by a parent snapshot.

According to aspects described herein, when one or more snapshots in the snapshot chain are requested to be deleted (e.g., to clear up storage space), deletion of the requested snapshots may occur in a reverse order starting from the most recently created snapshot, among the snapshots to be deleted, in the snapshot chain (referred to herein as the descendant snapshot). As mentioned, the descendant snapshot may include one or more shared data blocks (e.g., shared with a previous snapshot), one or more data blocks owned by the descendant snapshot, or any combination thereof. Thus, to exploit temporal locality of data blocks owned by the snapshot being deleted, e.g., for purposes of reducing the I/O cost when removing snapshots, only data blocks determined to be owned by the snapshot being deleted may be handled. As described in more detail below, MBA boundaries created between snapshots may be leveraged to determine which data blocks are owned by the snapshot. Further, data blocks of the snapshot shared with a previous snapshot may be processed (e.g., determined to be deleted or kept) only when removing the snapshot which owns such data blocks. Such techniques may save I/O costs (as compared to traditional methods), thereby improving performance of the overall system.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a PBA that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 144 is associated with host cluster 101. Virtualization management platform 144 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

In certain embodiments, in-memory metadata database 128 may include a snapshot table 140. As described in more detail below, snapshot table 140 may maintain a directory of one or more snapshots and their corresponding minimum MBA. Minimum MBAs associated with each of the snapshots maintained by snapshot table 140 may be used to determine which data blocks are owned by one or more snapshots for purposes of deletion.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

In certain embodiments, VSAN module 108 (and, in certain embodiments, more specifically, zDOM sub-module 132 of VSAN module 108, described in more detail below) may be configured to delete one or more snapshots created in a chain of snapshot. According to aspects described herein, VSAN module 108 may be configured to perform the deletion of one or more snapshots in a reverse order (e.g., starting the deletion with a latest snapshot of the one or more snapshots to be deleted that was created latest in time and performing a deletion of each snapshot requested to be deleted until an earliest snapshot of the one or more snapshots requested to be deleted, e.g., that was created earliest in time, is deleted). The reverse deletion of snapshots performed by VSAN module 108 may be described in more detail below with respect to FIGS. 3-8. The reverse deletion of snapshots may save I/O costs (as compared to traditional methods), thereby improving performance of the overall system.

Various sub-modules of VSAN module 108, including, in some embodiments, CLOM sub-module 130, distributed object manager (DOM) sub-module 134, zDOM sub-module 132, and/or local storage object manager (LSOM) sub-module 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. Lower write amplification may increase performance and lifespan of an SSD.

In some embodiments, zDOM sub-module 132 performs other datastore procedures, such as data compression and hash calculation, which may result in substantial improvements, for example, in garbage collection, deduplication, snapshotting, etc. (some of which may be performed locally by LSOM sub-module 136 of FIG. 1).

In some embodiments, zDOM sub-module 132 stores and accesses an extent map 142. Extent map 142 provides a mapping of LBAs to PBAs, or LBAs to MBAs to PBAs. Each physical block having a corresponding PBA may be referenced by one or more LBAs.

In certain embodiments, for each LBA, VSAN module 108, may store in a logical map of extent map 142, at least a corresponding PBA. The logical map may include an LBA to PBA mapping table. For example, the logical map may store tuples of <LBA, PBA>, where the LBA is the key and the PBA is the value. As used herein, a key is an identifier of data and a value is either the data itself or a pointer to a location (e.g., on disk) of the data associated with the identifier. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key).

In certain other embodiments, for each LBA, VSAN module 108, may store in a logical map, at least a corresponding MBA, which further maps to a PBA in a middle map of extent map 142. In other words, extent map 142 may be a two-layer mapping architecture. A first map in the mapping architecture, e.g., the logical map, may include an LBA to MBA mapping table, while a second map, e.g., the middle map, may include an MBA to PBA mapping table. For example, the logical map may store tuples of <LBA, MBA>, where the LBA is the key and the MBA is the value, while the middle map may store tuples of <MBA, PBA>, where the MBA is the key and the PBA is the value.

The middle map is included in the mapping architecture, such as to address the problem of I/O overhead when dynamically relocating physical data blocks for full stripe writes. In particular, to reduce I/O overhead during write operations to the capacity tier of object store 118, zDOM sub-module 132 may require a full stripe (also referred to herein as a full segment) before writing the data to the capacity tier. Because some SSDs of object store 118 may only allow write after erase operations (e.g., program/erase (P/E) cycles) and may not permit re-write operations, a number of active blocks of a stripe may be decreased. In order to provide clean stripes for full stripe writes, segment cleaning may be introduced to recycle segments partially filled with "valid" blocks (e.g., active blocks) and move such valid block(s) to new location(s) (e.g., new stripe(s)). In other words, segment cleaning consolidates fragmented free space to improve write efficiency. The dynamic relocation of valid (e.g., active) blocks to new location(s) may trigger updates to extent map 142, as well as a snapshotting mapping architecture. In some cases, such updates to mapping tables of the snapshot mapping architecture may introduce severe I/O overhead.

In particular, each snapshot included in the snapshot mapping architecture may have its own snapshot logical map. Where a logical map has not been updated from the time a first snapshot was taken to a time a subsequent snapshot was taken, snapshot logical maps may include identical tuples for the same LBA. As more snapshots are accumulated over time (i.e., increasing the number of snapshot logical maps), the number of references to a same PBA extent may increase. Accordingly, numerous metadata write I/Os at the snapshot logical maps needed to update the PBA for LBA(s) of multiple snapshots (e.g., during segment cleaning) may result in poor snapshot performance at VSAN 116. For this reason, the two-layer snapshot mapping architecture, including a middle map, may be used to address the problem of I/O overhead when dynamically relocating physical data blocks.

For example, data block content referenced by a first LBA, LBA1, of three snapshots (e.g., snapshot A, B, and C) may all map to a first MBA, MBA1, which further maps to a first PBA, PBA1. If the data block content referenced by LBA1 is moved from PBA1 to another PBA, for example, PBA10, due to segment cleaning for a full stripe write, only a single extent at a middle map may be updated to reflect the change of the PBA for all of the LBAs which reference that data block. In this example, a tuple for MBA1 stored at the middle map may be updated from <MBA1, PBA1> to <MBA1, PBA10>. This two-layer snapshot extent architecture reduces I/O overhead by not requiring the system to update multiple references to the same PBA extent at different snapshot logical maps. Additionally, the two-layer snapshot extent architecture removes the need to keep another data structure to find all snapshot logical map pointers pointing to a middle map.

Embodiments herein are described with respect to the two-layer snapshot extent architecture having both a logical map and a middle map.

In certain embodiments, the logical map of the two-layer snapshot extent mapping architecture is a B+ tree. B+ trees are used as data structures for storing the metadata. A B+ tree is a multi-level data structure having a plurality of nodes, each node containing one or more key-value pairs. In this case, the key-value pairs may include tuples of <LBA, MBA> mappings stored in the logical map.

Figure 2A:
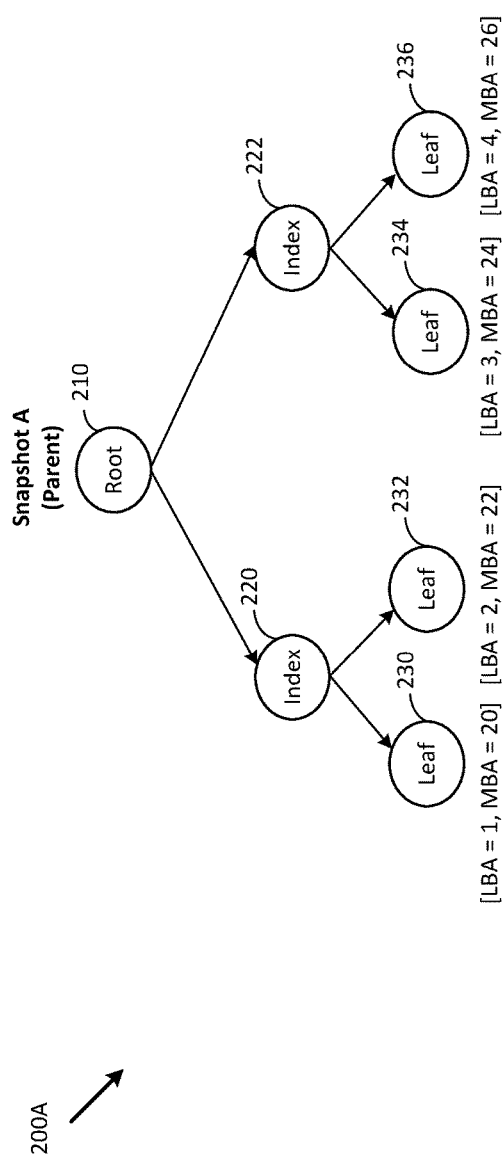
FIG. 2A is a block diagram illustrating a B+ tree data structure, according to an example embodiment of the present application.

FIG. 2A is a block diagram illustrating a B+ tree 200 data structure, according to an example embodiment of the present application. As illustrated, B+ tree 200A may include a plurality of nodes connected in a branching tree structure. Each node may have one parent and two or more children. The top node of a B+ tree may be referred as root node 210, which has no parent node. The middle level of B+ tree 200A may include middle nodes 220 and 222, which may have both parent and child nodes. In the illustrated example, B+ tree 200A has only two levels, and thus only a single middle level, but other B+ trees may have more middle levels and thus greater heights. The bottom level of B+ tree 200A may include leaf nodes 230-236 which do not have any more children. In the illustrated example, in total, B+ tree 200A has seven nodes, two levels, and a height of three. Root node 210 is in level two of the tree, middle (or index) nodes 220 and 222 are in level one of the tree, and leaf nodes 230-236 are in level zero of the tree.

Each node of B+ tree 200A may store at least one tuple. In a B+ tree, leaf nodes may contain data values (or real data) and middle (or index) nodes may contain only indexing keys. For example, each of leaf nodes 230-236 may store at least one tuple that includes a key mapped to real data, or mapped to a pointer to real data, for example, stored in a memory or disk. As shown in FIG. 2A, these tuples may correspond to key-value pairs of <LBA, MBA> mappings for data blocks associated with each LBA. In some embodiments, each leaf node may also include a pointer to its sibling(s), which is not shown for simplicity of description. On the other hand, a tuple in the middle and/or root nodes of B+ tree 200A may store an indexing key and one or more pointers to its child node(s), which can be used to locate a given tuple that is stored in a child node.

Because B+ tree 200A contains sorted tuples, a read operation such as a scan or a query to B+ tree 200A may be completed by traversing the B+ tree relatively quickly to read the desired tuple, or the desired range of tuples, based on the corresponding key or starting key.

In certain embodiments, the logical map B+ tree may be a copy-on-write (COW) B+ tree (also referred to as an append-only B+ tree). COW techniques improve performance and provide time and space efficient snapshot creation by only copying metadata about where the original data is stored, as opposed to creating a physical copy of the data, when a snapshot is created. Accordingly, when a COW approach is taken and a new child snapshot is to be created, instead of copying the entire logical map B+ tree of the parent snapshot, the child snapshot shares with the parent and ancestor snapshots one or more extents by having a B+ tree index node, exclusively owned by the child B+ tree, point to shared parent and/or ancestor B+ tree nodes. This COW approach for the creation of a child B+ tree may be referred to as a "lazy copy approach" as the entire logical map B+ tree of the parent snapshot is not copied when creating the child B+ tree.

Figure 2B:
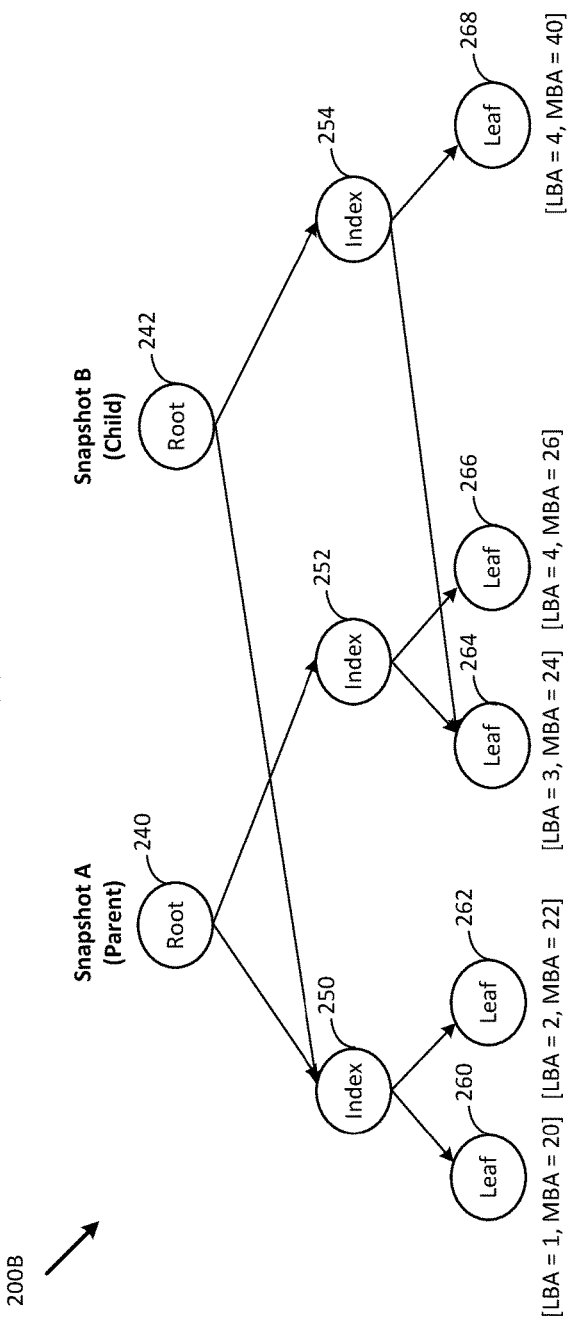
FIG. 2B is a block diagram illustrating a B+ tree data structure using a copy-on-write (COW) approach for the creation of a child snapshot, according to an example embodiment of the present application.

FIG. 2B is a block diagram illustrating a B+ tree data structure 200B using a COW approach for the creation of a child snapshot, according to an example embodiment of the present application. As shown in FIG. 2B, middle node 250 and leaf node 264 are shared by root node 240 of a first B+ tree (e.g., a parent snapshot B+ tree) and root node 242 of a second B+ tree (e.g., a child snapshot B+ tree) generated from the first B+ tree. This way, the two root nodes 240 and 242 may share the data of the tree without having to duplicate the entire data of the tree. Further, root node 240 may exclusively own leaf node 266, while root node 242 may exclusively own leaf node 268.

Based on the example B+ tree data structure 200B illustrated in FIG. 2B, a logical map of the parent snapshot may include four extents corresponding to tuples <LBA1, MBA20>, <LBA2, MBA22>, <LBA3, MBA24>, and <LBA4, MBA26>. Each of these tuples may be stored at leaf nodes 260-266, respectively, of the parent snapshot B+ tree. Further, a logical map of the child snapshot may include four extents corresponding to tuples <LBA1, MBA20>, <LBA2, MBA22>, <LBA3, MBA24>, and <LBA4, MBA40>. Because the node containing a tuple for LBA4 is the only node of the parent snapshot B+ tree not shared with the child snapshot B+ tree, LBA4 is the only LBA overwritten during a time between when the parent snapshot was created and when the child snapshot was created. Accordingly, data blocks written at PBAs mapped to MBA20, MBA22, and MBA24 (e.g., in a middle map maintained for all snapshots created) may be considered data blocks shared between the parent snapshot and the child snapshot, whereas, a data block written at the PBA mapped to MBA40 may be considered a data block owned by the child snapshot.

Performing a lookup in a child snapshot logical map may involve scanning both B+ tree nodes exclusively owned by the child snapshot, as well as B+ tree nodes shared from a parent and/or ancestor snapshot. Accordingly, when a parent or ancestor snapshot is to be deleted, prior to deletion of the parent or ancestor snapshot, data blocks of the parent or ancestor snapshot may be categorized as shared data blocks or data blocks owned by the snapshot. Only those data blocks determined to be exclusively owned by the parent or ancestor snapshot (e.g., owned by the parent or ancestor snapshot and not shared with a child or descendant snapshot of the parent or ancestor snapshot) may be deleted. Data blocks determined to be shared with the child snapshot may be "inherited" by the child snapshot such that when a lookup is performed, the previously shared data block, may still be located.

Techniques for the deletion of one or more snapshots in a chain of snapshots described herein may occur in a reverse order starting from a descendant snapshot. As mentioned, the descendant snapshot may include one or more shared data blocks (e.g., shared with a previous snapshot), one or more data blocks owned by the snapshot, or any combination thereof. Thus, to exploit temporal locality of data blocks owned by the snapshot being deleted, e.g., for purposes of reducing the I/O cost when removing snapshots, only data blocks determined to be owned by the snapshot being deleted may be handled. As described in more detail below with respect to FIGS. 3-7, MBA boundaries created between snapshots may be leveraged to determine which data blocks are owned by the snapshot. Further, data blocks of the snapshot shared with a previous snapshot may be processed (e.g., determined to be deleted or kept) only when removing the snapshot which owns such data blocks.

FIGS. 3-7 illustrate a process for the deletion of snapshots in a snapshot chain, according to an example embodiment of the present application. In the example illustrated in FIGS. 3-7, four snapshots (e.g., S1, S2, S3, and S4) may exist in a snapshot chain, where S1 is the parent snapshot of S2, S2 is the parent snapshot of S3, and S3 is the parent snapshot of S4. A request may be received by a VSAN module, such as VSAN module 108 illustrated in FIG. 1, to delete snapshots S1-S3 in the chain of snapshots.

Figure 3:
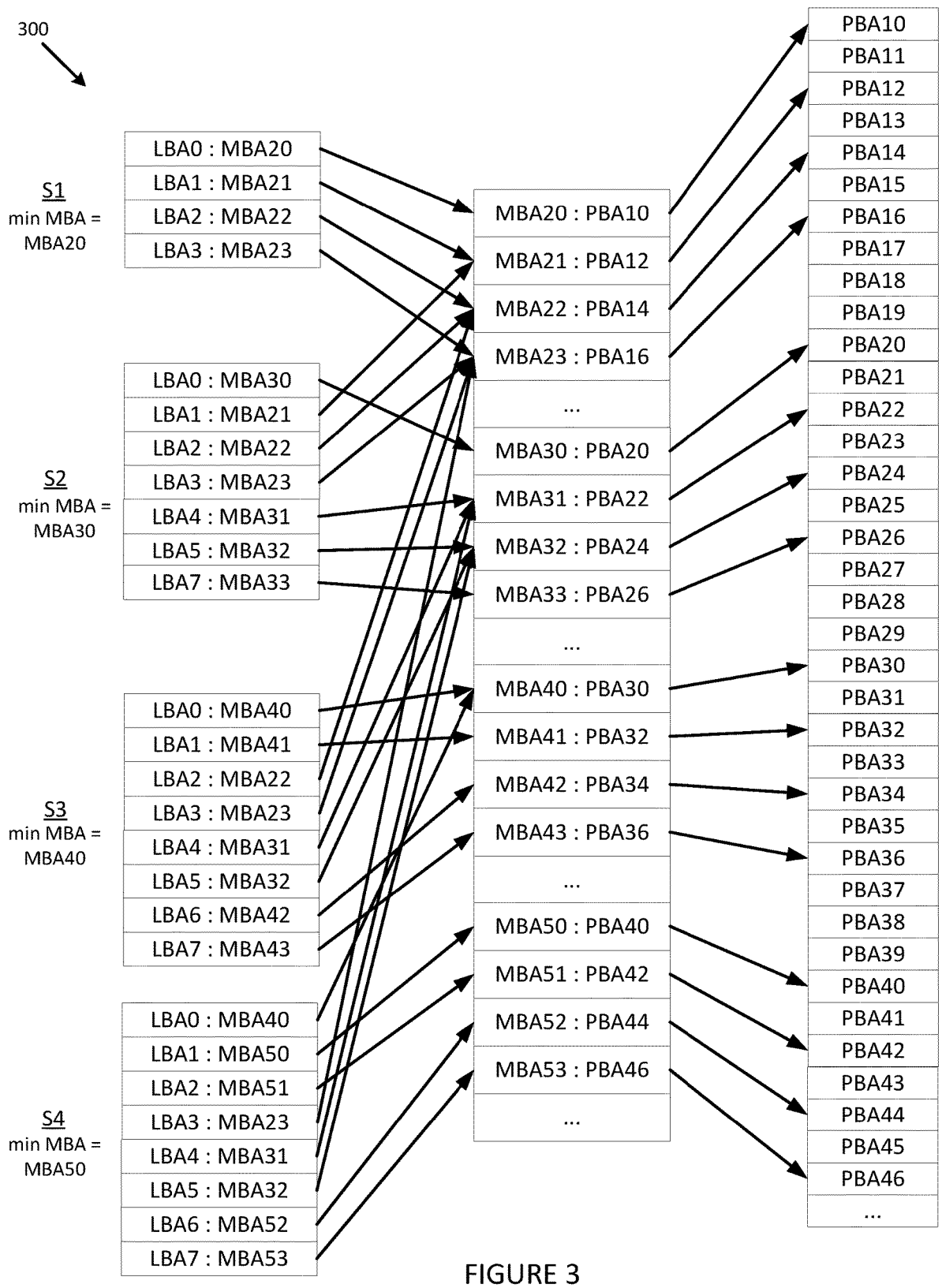
FIGS. 3-7 illustrate an example process for the deletion of snapshots in a snapshot chain, according to an example embodiment of the present application.
Figure 4:
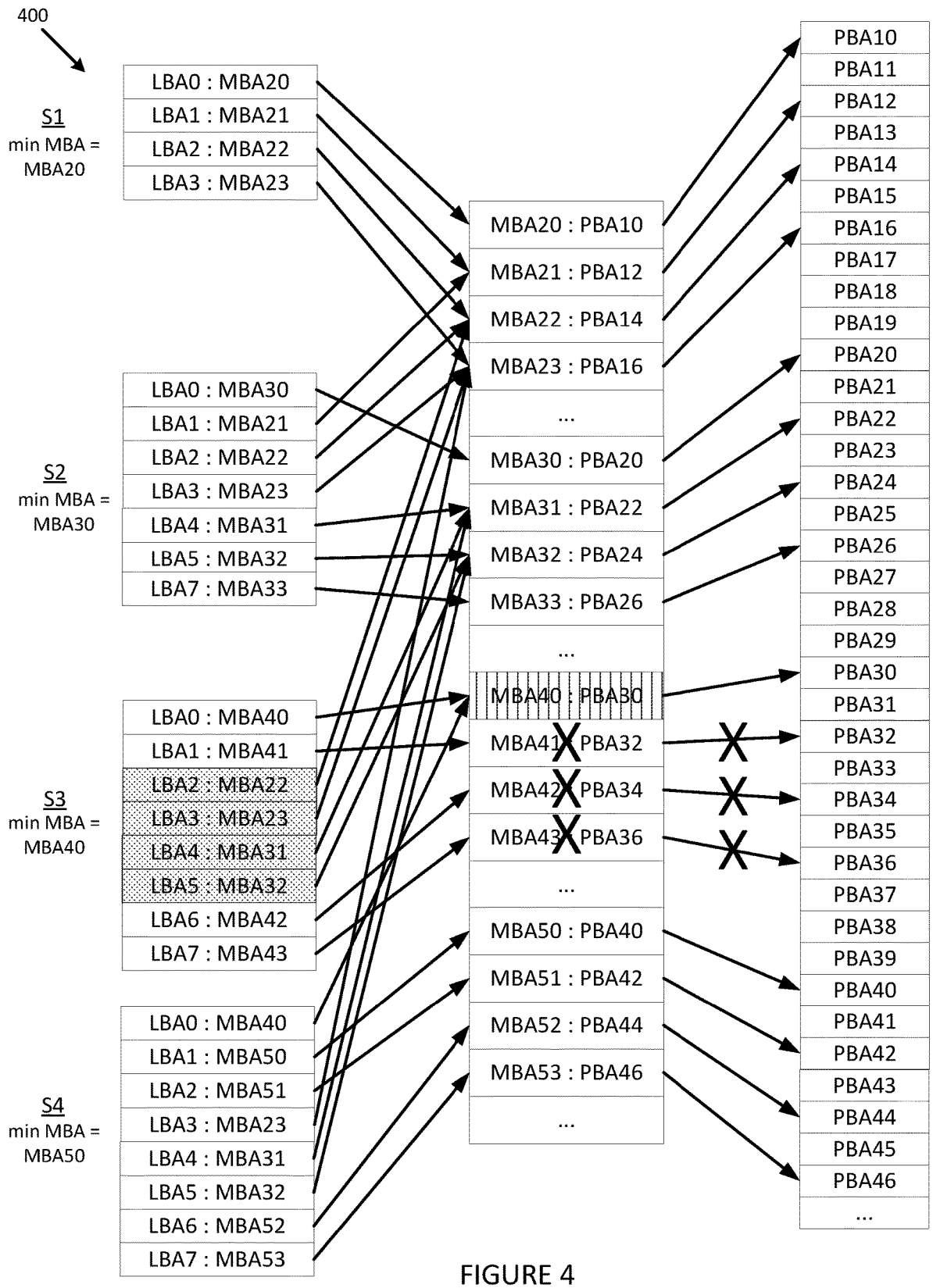
Figure 5:
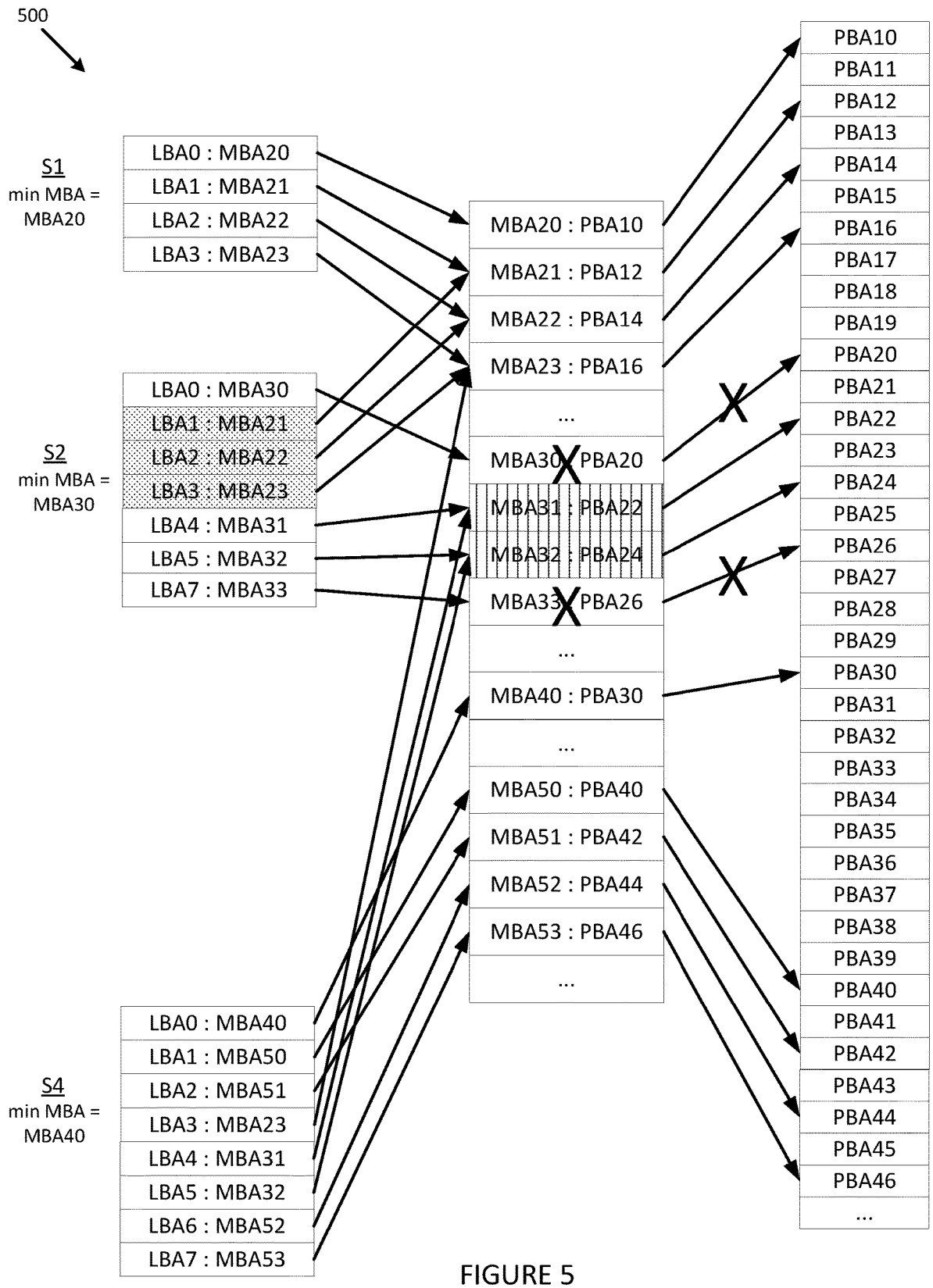
Figure 6:
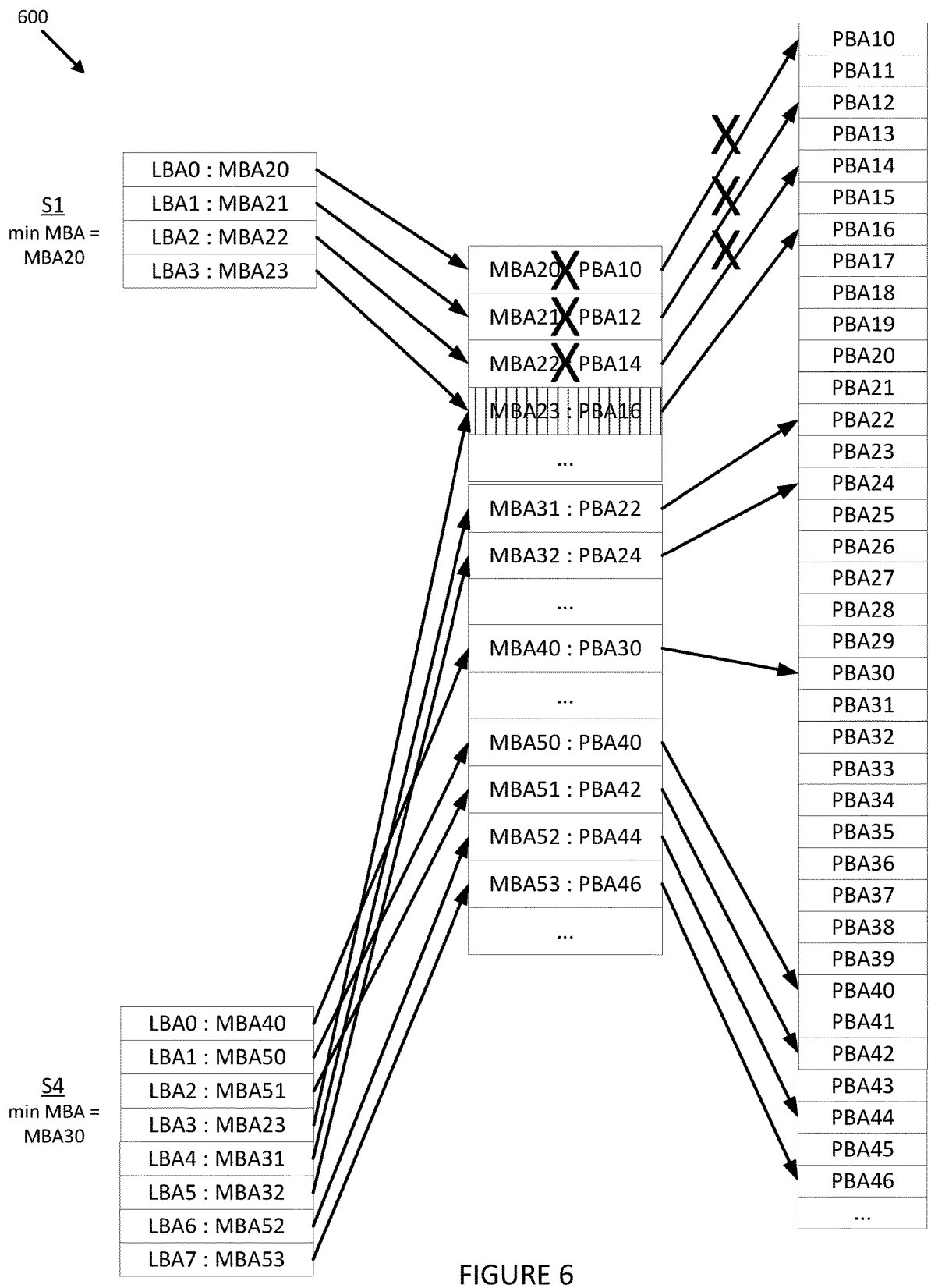
Figure 7:
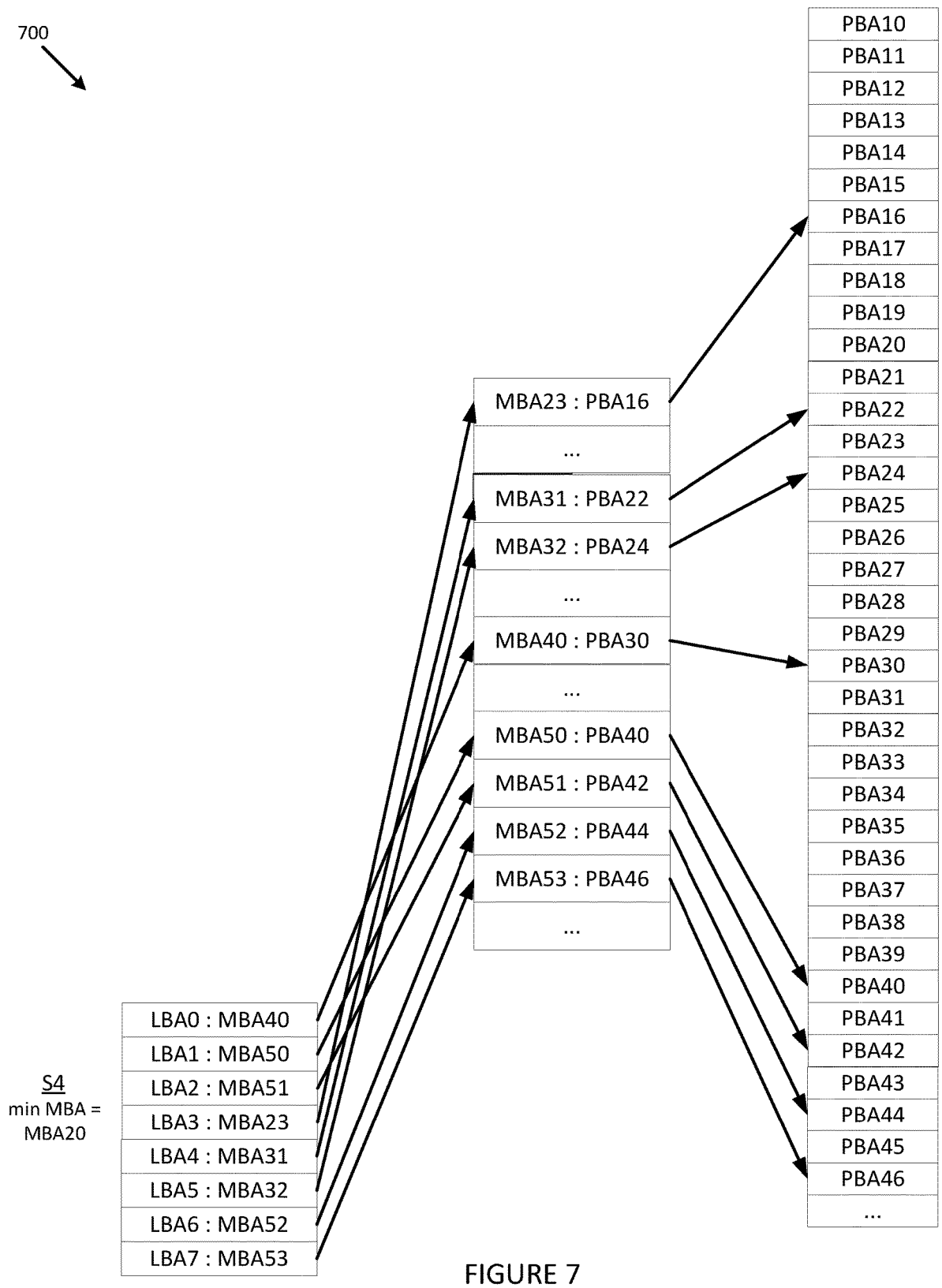

FIGS. 3-7 illustrate the sequential process for deleting S1, S2, and S3 in accordance with the received request. In particular, FIG. 3 illustrates an example two-layer snapshot extent mapping architecture for S1, S2, S3, and S4 in the snapshot chain at time t0 when the request to delete snapshots S1-S3 is received by VSAN module 108. FIG. 4 illustrates an update to the example two-layer snapshot extent mapping architecture when S3 is deleted at time t1. FIG. 5 illustrates an update to the example two-layer snapshot extent mapping architecture when S2 is deleted at time t2. FIG. 6 illustrates an update to the example two-layer snapshot extent mapping architecture when S1 is deleted at time t3. FIG. 7 illustrates the example two-layer snapshot extent mapping architecture at time t4, after the deletion of S1-S3.

Further, as shown in FIGS. 3-7, the first layer of the two-layer snapshot extent mapping architecture may include a snapshot logical map. The schema of the snapshot logical map may store a one tuple key <LBA> to a one-tuple value <MBA>. In some embodiments, other tuple values, such as a number of blocks, a number of sectors, compression size, etc. may also be stored in the snapshot logical map. Because a middle map extent may refer to a number of contiguous blocks, value "number of blocks" may indicate a number of uncompressed contiguous middle map blocks for which the data is stored within. The second layer of the two-layer snapshot extent mapping architecture includes a middle map responsible for maintaining a mapping between MBA(s) and PBA(s) (or physical sector address(es) (PSA(s)) of one or more sectors (e.g., each sector being 512-byte) of a physical block where blocks are compressed prior to storage). Accordingly, the schema of the middle map may store a one tuple key <MBA> and a one-tuple value <PBA>. In some embodiments, other tuple values, such as a number of blocks may also be stored in the snapshot logical map. A value of the "number of blocks" may indicate a number of contiguous blocks starting at the indicated PBA. In certain embodiments (not shown), each physical block may be subdivided into a number of sectors (e.g., eight sectors); thus, the schema of the middle map may store a one tuple key <MBA> and a four-tuple value <PSA, numBlocks, numSectors, compression size>.

In the example of FIG. 3, at time t0, the logical map of S1 includes extents [LBA0, MBA20], [LBA1, MBA21], [LBA2, MBA22], and [LBA3, MBA23]. Although a data block associated with LBA0 is written at PBA10, instead of mapping LBA0 to PBA10, a middle map extent (e.g., MBA20, with a monotonically increased MBA) is created such that LBA0 maps to MBA20 and MBA20 maps to PBA10. The extent [LBA0, MBA20] is maintained in a logical map associated with S1 and an extent [MBA20, PBA10] is maintained in the middle map created for use by all snapshots, S1-S4. Similarly, middle map extents, with monotonically increased MBA values, may be created for mapping LBA1, LBA2, and LBA3 to the created MBAs, and further to PBAs where their associated data blocks are written.

The logical map of S2 includes extents [LBA0, MBA30], [LBA1, MBA21], [LBA2, MBA22], [LBA3, MBA23], [LBA4, MBA31], [LBA5, MBA32], and [LBA7, MBA33]. Accordingly, based on the extents included in the logical map of S2, during the time between when S1 and S2 was created, data block content associated with LBA1 was written to a new PBA (e.g., from PBA10 to PBA20) and a new middle map extent, associated with MBA30, was created to map to this new PBA. Further, based on the extents included in the logical map of S2, during the time between when S1 and S2 was created, data block content for LBA4, LBA5, and LBA7 was written at PBA22, PBA24, and PBA26, respectively. New middle map extents, having monotonically increased MBAs, were also created to map the LBAs to their respective PBAs (e.g., middle maps extents [MBA31, PBA22], [MBA32, PBA24], and [MBA33, PBA26] were created). Because data block content associated with LBA1, LBA2, and LBA3 was not overwritten during the time between when S1 and S2 were created, logical map extents for LBA1, LBA2, and LBA3 in the snapshot logical map for S2 may include MBAs created at S1 (e.g., may share data blocks written at S1, and their corresponding middle map extents).

The logical map of S3 includes extents [LBA0, MBA40], [LBA1, MBA41], [LBA2, MBA22], [LBA3, MBA23], [LBA4, MBA31], [LBA5, MBA32], [LBA6, MBA42], and [LBA7, MBA43]. Accordingly, based on the extents included in the logical map of S3, during the time between when S2 and S3 were created, data block content associated with LBA0, LBA1, and LBA7 was written to new PBAs (and new middle map extents were created) and new data block content for LBA6 was written at PBA34. Because data block content associated with LBA2, LBA3, LBA4, and LBA5 was not overwritten during the time between when S2 and S3 were created, logical map extents for LBA2, LBA3, LBA4, and LBA5 in the snapshot logical map for S3 may include MBAs created at either S1 and/or S2 (e.g., may share data blocks written at S1 and/or S2, and their corresponding middle map extents).

The logical map of S4 includes extents [LBA0, MBA40], [LBA1, MBA50], [LBA2, MBA51], [LBA3, MBA23], [LBA4, MBA31], [LBA5, MBA32], [LBA6, MBA53], and [LBA7, MBA54]. Accordingly, based on the extents included in the logical map of S4, during the time between when S3 and S4 were created, data block content associated with LBA1, LBA2, LBA6, and LBA7 was written to new PBAs (and new middle map extents were created). Because data block content associated with LBA0, LBA3, LBA4, and LBA5 was not overwritten during the time between when S3 and S4 were created, logical map extents for LBA0, LBA3, LBA4, and LBA5 in the snapshot logical map for S3 may include MBAs created at either S1, S2, and/or S3 (e.g., may share data blocks written at S1, S2, and/or S3, and their corresponding middle map extents).

Further, as shown in FIG. 3, a minimum MBA may be associated with each of S1-S4. The minimum MBA may be indicate the smallest MBA associated with data blocks owned by each snapshot. For example, the minimum MBA associated with S2 is MBA30. New data block content written at S2 includes data block content for LBA0, LBA4, LBA5, and LBA7. New middle map extents created for each of these writes (e.g., to map each LBA to its PBA where the data block content was written) are created with new MBA values equal to or greater than MBA30. Accordingly, because MBA30 is the smallest MBA generated at S2, the minimum MBA for S2 is set to MBA30. As described in more detail below, minimum MBAs associated with each of S1-S4 may be used to determine which data blocks are owned by the snapshot for purposes of deletion. The minimum MBA associated with each snapshot may be maintained in a snapshot table in a VSAN, such as snapshot table 140 of VSAN 116 illustrated in FIG. 1.

In accordance with the request received by VSAN module 108, S1, S2, and S3 may be deleted. According to aspects described herein, deletion of S1, S2, and S3 may occur in reverse order beginning with S3. Accordingly, as shown in FIG. 4, when S3 is to be deleted, VSAN module 108 may first determine which data blocks are owned by S3 and which data blocks of S3 are shared with a previous snapshot in the snapshot chain (e.g., S1 or S2). This determination may be made based on the minimum MBA associated with S3, which is stored in snapshot table 140. In particular, middle map extents pointing to data blocks shared with a previous snapshot in the snapshot chain may have an MBA less than the minimum MBA associated with S3. In the illustrated example, VSAN module 108 determines data blocks associated with logical map extents [LBA2, MBA22], [LBA3, MBA23], [LBA4, MBA31], and [LBA5, MBA32] as data blocks that are shared with a previous snapshot in the snapshot chain based on MBA values of each of these logical map extents being less than MBA40 (e.g., the minimum MBA associated with S3). Accordingly, these data blocks, and their associated extents (e.g., patterned with dots in FIG. 4), may be skipped. When deleting S3, only data blocks, and their associated middle map extents, associated with logical map extents [LBA0, MBA40], [LBA1, MBA41], [LBA6, MBA42], and [LBA7, MBA43] are deleted. In particular, after determining which data blocks are owned by S3, further determination as to whether such data blocks are shared with a subsequent snapshot (e.g., a snapshot later in the snapshot chain, for example, S4) may be made. Data blocks, and their associated middle map extents, shared with a subsequent snapshot may not be deleted.

For example, in FIG. 4, a data block associated with PBA30 may not be deleted, as PBA 30 and its associated middle map extent [MBA40, PBA30] (e.g., patterned with vertical stripes in FIG. 4) is shared by a logical map extent present in S4. On the other hand, data blocks associated with PBA32, PBA34, and PBA36, as well as their associated middle map extents [MBA41, PBA32], [MBA42, PBA34], and [MBA43, PBA36], respectively, may be removed. The data blocks removed may all belong to a same leaf page owned by S3, as such, only a single I/O page cost may be necessary to delete these data blocks.

Following deletion of these data blocks and their associated metadata, remaining middle map extent [MBA40, PBA30] previously created for a data block owned by now-deleted S3 may be "inherited" by S4. "Inheritance" of the data block and its associated metadata may include updating the minimum MBA of S4 to the minimum MBA associated with S3 prior to deletion. In this example, the minimum MBA associated with S4 may be updated from MBA50 to MBA40 in snapshot table 140, and S3 may be removed from snapshot table 140. The two-layer snapshot extent mapping architecture following deletion of S3 may resemble the mapping architecture illustrated in FIG. 5.

Continuing with the reverse order of deletion, deletion of S2 may follow the deletion of S3. Accordingly, as shown in FIG. 5, when S2 is to be deleted, VSAN module 108 may first determine which data blocks are owned by S2 and which data blocks of S2 are shared with a previous snapshot in the snapshot chain (e.g., S1) based on the minimum MBA associated with S2 (e.g., stored in snapshot table 140). In particular, middle map extents pointing to data blocks shared with a previous snapshot in the snapshot chain may have an MBA less than the minimum MBA associated with S2. In particular, data blocks associated with logical map extents [LBA1, MBA22], [LBA2, MBA23], and [LBA3, MBA32] may be determined to be shared with a previous snapshot in the snapshot chain based on MBA values of each of these logical map extents being less than MBA30 (e.g., associated with S2). Accordingly, these data blocks, and their associated extents (e.g., patterned with dots in FIG. 5), may be skipped. Thus, when deleting S2, only data blocks, and their associated middle map extents, associated with logical map extents [LBA0, MBA30], [LBA4, MBA31], [LBA5, MBA32], and [LBA7, MBA33] may be processed for purposes of deletion. In particular, after determining which data blocks are owned by S2, further determination as to whether the owned data blocks are shared with a subsequent snapshot (e.g., a snapshot later in the snapshot chain, for example, S4) may be made. Data blocks, and their associated middle map extents, shared with a subsequent snapshot may not be deleted.

For example, in FIG. 5, data blocks associated with PBA22 and PBA24 may not be deleted, as PBA22 and PBA24 and their associated middle map extents [MBA31, PBA22] and [MBA32, PBA24] (e.g., patterned with vertical stripes in Figure), respectively, are shared by a logical map extent present in S4. On the other hand, data blocks associated with PBA20 and PBA26, as well as their associated middle map extents [MBA30, PBA20] and [MBA33, PBA26], respectively, may be removed. The data blocks removed may all belong to a same leaf page owned by S2, as such, only a single I/O page cost may be necessary to delete these data blocks.

Following deletion of these data blocks and their associated metadata, remaining middle map extents [MBA31, PBA22] and [MBA32, PBA24] previously created for data blocks owned by now-deleted S2 may be "inherited" by S4. Accordingly, the minimum MBA associated with S4 may be updated from MBA40 to MBA30 in snapshot table 140, and S2 may be removed from snapshot table 140. The two-layer snapshot extent mapping architecture following deletion of S2 may resemble the mapping architecture illustrated in FIG. 6.

Continuing with the reverse order of deletion, deletion of S1 may follow the deletion of S2. Similar processes used to delete S2 and S3 described with respect to FIG. 5 and FIG. 4, respectively, may be used to delete S1. Data blocks removed for S1 may all belong to a same leaf page owned by S1, as such, only a single I/O page cost may be necessary to delete these data blocks.

Remaining middle map extents created for data blocks written at S1 may include middle map extent [MBA23, PBA16]. Accordingly, middle map extent [MBA23, PBA16] may be "inherited" by S4 by updating the minimum MBA associated with S4 from MBA30 to MBA20 in snapshot table 140, and removing S1 from snapshot table 140. The two-layer snapshot extent mapping architecture following deletion of S1 may resemble the mapping architecture illustrated in FIG. 7.

In the example process for the deletion of snapshots in a snapshot chain illustrated in FIGS. 3-7, three I/O page costs may be used to remove S1-S3. Three I/O page costs to remove S1-S3 using the process described herein may allow for a saving of nearly 50% of the I/O costs required to delete S1-S3 using a traditional approach (e.g., the traditional approach may require six I/O page costs to remove S1-S3). As mentioned the traditional approach processes snapshots to be deleted in sequential order; thus, S1 may be deleted before S2 which may be deleted before S3. Blocks owned by each of S1, S2, and S3 may be deleted when deleting each of S1, S2, and S3, respectively; however, shared data blocks may be inherited by the next snapshot to be deleted in the snapshot chain. For example, when deleting S1, data blocks owned by S1 may be deleted; however, data blocks shared with S2 may be "inherited" by S2. Accordingly, when S2 is removed, data blocks which are to be removed may belong to both a page associated with S1 (where the data block is inherited) and a page associated with S2 (where the data block was originally owned by S2). Further, when S3 is removed, data blocks which are to be removed may belong to a page associated with S1, a page associated with S2, and/or a page associated with S3. Removal of data blocks from each of these pages may require a separate I/O per page thereby increasing the total number of I/Os needed to remove S1-S3.

Although techniques described herein for the deletion of snapshots are related to the deletion of snapshots in a snapshot chain, the techniques may also be leveraged to delete a group of snapshots, wherein one or more snapshots in the group of snapshots have parent-child relationships. In particular, child snapshots of the parent-child snapshot relationships may be recursively processed for deletion before handling a current snapshot to be deleted.

Figure 8:
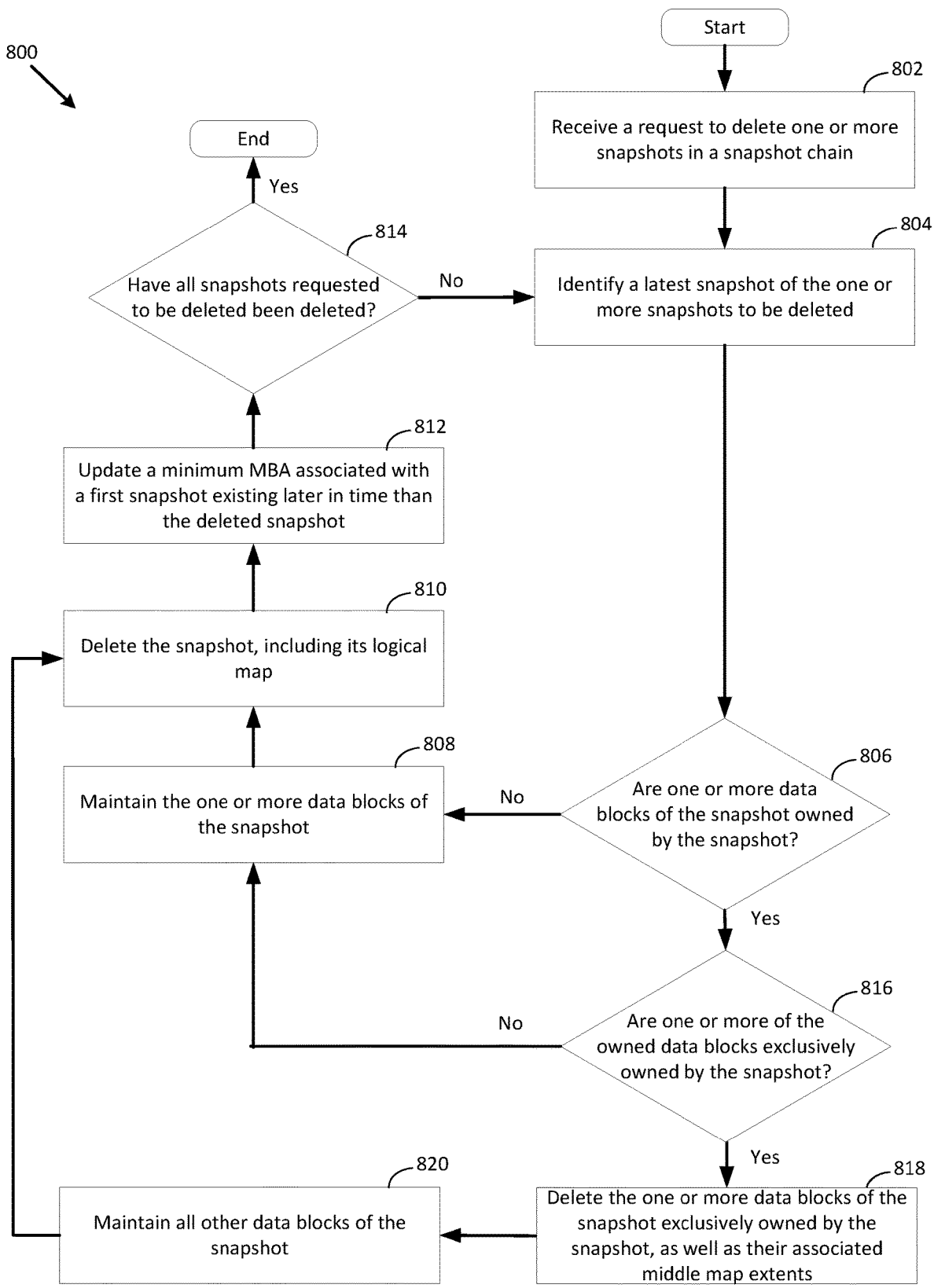
FIG. 8 is an example workflow for the deletion of snapshots in a snapshot chain, according to an example embodiment of the present application.

FIG. 8 is an example workflow 800 for the deletion of snapshots in a snapshot chain, according to an example embodiment of the present application. Workflow 800 may be performed by VSAN module 108, illustrated in FIG. 1, to delete snapshots in the snapshot chain.

Workflow 800 may begin, at operation 802, by a VSAN module 108 receiving a request to delete one or more snapshots in a snapshot chain. Accordingly, at operation 804, VSAN module 108 may identify a latest snapshot of the one or more snapshots to be deleted. The latest snapshot may be a snapshot of the one or more snapshots to be deleted that was created latest in time. Using the example illustrated in FIGS. 3-7, where VSAN module 108 receives a request to delete snapshots S1-S3, VSAN module 108 may determine the latest snapshot to be deleted is S3, as S3 was created later in time than both S1 and S2.

At operation 806, VSAN module 108 may determine whether one or more data blocks of the snapshot identified at operation 804 are owned by the snapshot. As described herein, a data block may be considered to be owned by the snapshot when an MBA associated with the data block is greater than or equal to a minimum MBA associated with the snapshot.

Where VSAN module 108 determines data blocks of the snapshot are not owned by the snapshot (e.g., data blocks of the snapshot are shared with an earlier created snapshot given their associated MBAs are less than the minimum MBA associated with the snapshot), at operation 808, VSAN module 108 may maintains the one or more shared data blocks of the snapshot. In other words, VSAN module 108 may skip processing the one or more shared data blocks of the snapshot.

If none of the data blocks of the snapshot are owned by the snapshot, then at operation 810, VSAN module 108 deletes the snapshot, including a logical map associated with the snapshot. At operation 812, VSAN module 108 updates a minimum MBA associated with a first snapshot existing later in time than the deleted snapshot. The minimum MBA of the first snapshot may be updated to match a minimum MBA of the now-deleted snapshot. For example, as previously described with respect to FIG. 5 of the example deletion process described for FIGS. 3-7, when S3 is deleted, VSAN module 108 determines that S4 is the first snapshot in the snapshot chain existing later in time after S3 (e.g., where S4 is the child snapshot of S3). Accordingly VSAN module 108 updates the minimum MBA of S4 from MBA50 to MBA40, which was the minimum MBA associated with S3 prior to deletion.

At operation 814, VSAN module 108 determines whether all snapshots requested to be deleted have been deleted. If all snapshots that are requested to be deleted have been deleted (e.g., requesting to delete three different snapshots and all three snapshots have been deleted), workflow 800 is complete. However, where all snapshots that are requested to be deleted have not been deleted (e.g., requesting to three different snapshots and only one or two of the requested snapshots have been deleted), workflow 800 returns to operation 804 where a new latest snapshot is determined. In this case, the latest snapshot may be a different latest snapshot than the prior determined latest snapshot (which, at this point, has been deleted). The process may continue for this newly identified snapshot, as well as all other snapshots in the request of snapshots to be deleted, until all snapshots in the request of snapshots to be deleted have, in fact, been deleted.

Returning to operation 806, where VSAN module 108 determines one or more data blocks of the snapshot identified at operation 804 are owned by the snapshot, at operation 816, VSAN module 108 determines whether one or more data blocks, among the data blocks owned by the snapshot, are exclusively owned by the snapshot. In other words, at operation 816, VSAN module 108 determines whether one or more data blocks owned by the snapshot are shared with a snapshot created later in time and whether one or more data blocks owned by the snapshot are not shared with the snapshot created later in time (e.g., exclusively owned data blocks).

Where, at operation 816, VSAN module determines that all of the data blocks owned by the snapshot are shared with the snapshot created later in time (e.g., not exclusively owned), at operation 808, VSAN module 108 may maintain the one or more data blocks of the snapshot. On the other hand, where, at operation 816, VSAN module 108 determines that one or more of the data blocks owned by the snapshot are not shared with the snapshot created later in time (e.g., are exclusively owned), at operation 818, VSAN module 108 may delete such blocks determined to be exclusively owned by the snapshot, as well as their associated metadata (e.g., including their corresponding middle map extent). VSAN module 108 may maintain, at operation 820, all other data blocks of the snapshot (e.g., data blocks not owned by the snapshot and data blocks owned by the snapshot but shared with a later snapshot in time).

Workflow 800 may then proceed to operations 810 and 812 where VSAN module 108 deletes the snapshot, including its corresponding logical map, and updates a minimum MBA associated with a first snapshot existing later in time than the deleted snapshot, respectively. At operation 814, VSAN module 108 determines whether all snapshots requested to be deleted have been deleted. As mentioned, if all snapshots that are requested to be deleted have been deleted, workflow 800 is complete. However, where all snapshots that are requested to be deleted have not been deleted, workflow 800 returns to operation 804 where a new latest snapshot is determined.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for a reverse deletion of a plurality of snapshots in a chain of snapshots, the method comprising:
   in reverse order, starting from a latest snapshot in time of the plurality of snapshots to an earliest snapshot in time of the plurality of snapshots:
      identifying at least one of a first set of one or more data blocks of a snapshot that are shared with an earlier snapshot in time in the chain of snapshots or a second set of one or more data blocks of the snapshot that are owned by the snapshot, wherein:
         each data block in the first set of one or more data block and the second set of one or more data blocks is referenced by a logical block address (LBA) and a physical block address (PBA) corresponding to a physical block where each data block is written;
         a logical map associated with the snapshot includes an entry for each data block in the first set of one or more data blocks and the second set of one or more data blocks, the logical map mapping the LBA of each data block to a middle block address (MBA) and a middle map including an entry that maps the MBA to the PBA of each data block;

each of the plurality of snapshots is associated with a minimum MBA; and identifying the first set of one or more data blocks comprises identifying data blocks having an MBA less than the minimum MBA associated with the snapshot; and processing the second set of one or more data blocks and skipping processing the first set of one or more data blocks, wherein processing the second set of one or more data blocks comprises:

determining which data blocks of the second set of one or more data blocks are shared with a later snapshot in time in the chain of snapshots and which data blocks of the second set of one or more data blocks are exclusively owned by the snapshot; and performing one or more actions on the second set of one or more data blocks based on the determination.

2. The method of claim 1, wherein identifying the second set of one or more data blocks comprises:

identifying data blocks having an MBA greater than or equal to the minimum MBA associated with the snapshot.

3. The method of claim 1, wherein performing the one or more actions on the second set of one or more data blocks comprises:

maintaining the data blocks of the second set of one or more data blocks that are determined to be shared with the later snapshot in time in the chain of snapshots.

4. The method of claim 3, wherein performing the one or more actions on the second set of one or more data blocks comprises:

deleting the data blocks of the second set of one or more data blocks that are determined to be exclusively owned by the snapshot.

5. The method of claim 1, further comprising:

when deleting the snapshot, updating a first minimum MBA associated with the subsequent later snapshot in time in the chain of snapshots to be a second minimum MBA associated with the snapshot.

6. The method of claim 1, wherein the plurality of snapshots are associated with a virtual computing instance (VCI) running on a host in a data center.

7. A system comprising:

one or more processors; and at least one memory, the one or more processors and the at least one memory configured to:

in reverse order, starting from a latest snapshot in time of a plurality of snapshots in a chain of snapshots to an earliest snapshot in time of the plurality of snapshots:

identify at least one of a first set of one or more data blocks of a snapshot that are shared with an earlier snapshot in time in the chain of snapshots or a second set of one or more data blocks of the snapshot that are owned by the snapshot wherein:

each data block in the first set of one or more data blocks and the second set of one or more data blocks is referenced by a logical block address (LBA) and a physical block address (PBA) corresponding to a physical block where each data block is written;

a logical map associated with the snapshot includes an entry for each data block in the first set of one or more data blocks and the second set of one or more data blocks, the logical map mapping the LBA of each data block to a middle block address (MBA) and a middle map including an entry that maps the MBA to the PBA of each data block;

each of the plurality of snapshots is associated with a minimum MBA; and to identify the first set of one or more data blocks comprises to identify data blocks having an MBA less than the minimum MBA associated with the snapshot; and process the second set of one or more data blocks and skip processing the first set of one or more data blocks, wherein processing the second set of one or more data blocks comprises:

determining which data blocks of the second set of one or more data blocks are shared with a later snapshot in time in the chain of snapshots and which data blocks of the second set of one or more data blocks are exclusively owned by the snapshot; and performing one or more actions on the second set of one or more data blocks based on the determination.

8. The system of claim 7, wherein identifying the second set of one or more data blocks comprises:

identifying data blocks having an MBA greater than or equal to the minimum MBA associated with the snapshot.

9. The system of claim 7, wherein performing the one or more actions on the second set of one or more data blocks comprises:

maintaining the data blocks of the second set of one or more data blocks that are determined to be shared with the later snapshot in time in the chain of snapshots.

10. The system of claim 9, wherein performing the one or more actions on the second set of one or more data blocks comprises:

deleting the data blocks of the second set of one or more data blocks that are determined to be exclusively owned by the snapshot.

11. The system of claim 7, wherein the one or more processors and the at least one memory are further configured to:

when deleting the snapshot, update a first minimum MBA associated with the subsequent later snapshot in time in the chain of snapshots to be a second minimum MBA associated with the snapshot.

12. The system of claim 7, wherein the plurality of snapshots are associated with a virtual computing instance (VCI) running on a host in a data center.

13. A non-transitory computer-readable medium comprising instructions that, when executed by one or more processors of a computing system, cause the computing system to perform operations for a reverse deletion of a plurality of snapshots in a chain of snapshots, the operations comprising:

in reverse order, starting from a latest snapshot in time of the plurality of snapshots to an earliest snapshot in time of the plurality of snapshots:

identifying at least one of a first set of one or more data blocks of a snapshot that are shared with an earlier snapshot in time in the chain of snapshots or a second set of one or more data blocks of the snapshot that are owned by the snapshot, wherein:
- each data block in the first set of one or more data block sand the second set of one or more data blocks is referenced by a logical block address (LBA) and a physical block address (PBA) corresponding to a physical block where each data block is written;
- a logical map associated with the snapshot includes an entry for each data block in the first set of one or more data blocks and the second set of one or more data blocks, the logical map mapping the LBA of each data block to a middle block address (MBA) and a middle map including an entry that maps the MBA to the PBA of each data block;
- each of the plurality of snapshots is associated with a minimum MBA; and
- identifying the first set of one or more data blocks comprises identifying data blocks having an MBA less than the minimum MBA associated with the snapshot; and processing the second set of one or more data blocks and skipping processing the first set of one or more data blocks, wherein processing the second set of one or more data blocks comprises:
- determining which data blocks of the second set of one or more data blocks are shared with a later snapshot in time in the chain of snapshots and which data blocks of the second set of one or more data blocks are exclusively owned by the snapshot; and
- performing one or more actions on the second set of one or more data blocks based on the determination.

14. The non-transitory computer-readable medium of claim 13, wherein identifying the second set of one or more data blocks comprises:
- identifying data blocks having an MBA greater than or equal to the minimum MBA associated with the snapshot.

15. The non-transitory computer-readable medium of claim 13, wherein performing the one or more actions on the second set of one or more data blocks comprises:
- maintaining the data blocks of the second set of one or more data blocks that are determined to be shared with the later snapshot in time in the chain of snapshots.

16. The non-transitory computer-readable medium of claim 15, wherein performing the one or more actions on the second set of one or more data blocks comprises:
- deleting the data blocks of the second set of one or more data blocks that are determined to be exclusively owned by the snapshot.

17. The non-transitory computer-readable medium of claim 13, wherein the operations further comprise:
- when deleting the snapshot, updating a first minimum MBA associated with the subsequent later snapshot in time in the chain of snapshots to be a second minimum MBA associated with the snapshot.

* * * * *